United States Patent
Yen et al.

(10) Patent No.: US 10,051,184 B2
(45) Date of Patent: Aug. 14, 2018

(54) IMAGE CAPTURE METHOD

(71) Applicant: TECO IMAGE SYSTEMS CO., LTD., Taipei (TW)

(72) Inventors: Yi-Chun Yen, Taipei (TW); Ko-Meng Chen, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 39 days.

(21) Appl. No.: 15/346,317

(22) Filed: Nov. 8, 2016

(65) Prior Publication Data

US 2018/0070014 A1 Mar. 8, 2018

(30) Foreign Application Priority Data

Sep. 6, 2016 (TW) .............................. 105128838 A (51) Int. Cl.
*H04N 5/232* (2006.01)
*G06F 3/0354* (2013.01)

(52) U.S. Cl.
CPC ..... *H04N 5/23267* (2013.01); *G06F 3/03543* (2013.01); *H04N 5/23222* (2013.01); *H04N 5/23258* (2013.01)

(58) Field of Classification Search
CPC ........... H04N 5/23267; H04N 5/23222; H04N 5/23258
See application file for complete search history.

(56) References Cited

U.S. PATENT DOCUMENTS

2014/0111638 A1* 4/2014 Isakov ............... H04N 5/23222
 348/135
2014/0118597 A1* 5/2014 Tabak ................ H04N 5/23293
 348/333.02

FOREIGN PATENT DOCUMENTS

| CN | 104539838 A | 4/2015 |
|---|---|---|
| JP | 2008-085860 A | 4/2008 |
| JP | 2013-251710 A | 12/2013 |
| JP | 2016-055361 A | 4/2016 |
| TW | 201030676 A1 | 8/2010 |
| TW | 201404133 A | 1/2014 |

* cited by examiner

*Primary Examiner* — Christopher K Peterson
(74) *Attorney, Agent, or Firm* — Kirton McConkie; Evan R. Witt (57) ABSTRACT

An image capture method includes steps of providing an image capture device, starting an image capture operation, detecting a first axial acceleration value, a second axial acceleration value, a third axial acceleration value and an image quality, and judging if any two of the first axial acceleration value, the second axial acceleration value and the third axial acceleration value exchange with each other. When the result of the judgement is False, the previous step of detection is re-performed, and when the result of the judgment is True, the next step of judging if the image quality is less than a predetermined value is performed. When the result of this judgement is False, the previous two steps of detection and judgement are re-performed, and when the result of this judgement is True, finishing the image capture operation. Therefore, the automatic finishing of the image capture is achieved without pushing any button.

10 Claims, 8 Drawing Sheets

IMAGE CAPTURE METHOD

CROSS-REFERENCE TO RELATED APPLICATION

This application claims priority from Taiwan Patent Application No. TW 105128838, filed on Sep. 6, 2016, the entire contents of which are incorporated herein by reference for all purposes.

FIELD OF THE INVENTION

The present invention relates to an image capture method, and more particularly to an image capture method at least having the function of automatically finishing an image capture operation.

BACKGROUND OF THE INVENTION

Since the modern people rely on electronic products day by days, the requirements of user experiences accompanied with the electronic products of the users are risen. While using the conventional hand-held image capture device to scan, it is not only necessary to push a power button to start, but also necessary to push the power button again to end the image capture, which limits much more to the users and makes the users feel inconvenient.

Particularly, the pushing action of ending the image capture has the highest possibility to cause a failure of image capture or get a discontinuous image. For example, when the force of pressing of a user is too large that causing the hand-held image capture device move, a failure of image capture may occur, or a discontinuous image may be gotten. If a user continuously press the power button for several times, or inadvertently press the power button during image capture, several image capture may be executed but none of any useful image will be obtained. In addition, in the long-term use of hand-held image capture device, there is a high potential for poor contact of the power button after many times of pressing, which is a huge test of the lifetime of the power button.

Meanwhile, to avoid the issues that cause the move of the hand-held image capture device, it can always been saw that a user stably fixes the hand-held image capture device with one hand and simultaneously pushes the power button with the other hand to ensure the image capture to be finished correctly. It is obviously brings poor user experiences.

Therefore, there is a need of providing an image capture method distinct from the prior art in order to solve the above drawbacks.

SUMMARY OF THE INVENTION

Some embodiments of the present invention are to provide an image capture method in order to overcome at least one of the above-mentioned drawbacks encountered by the prior arts.

The present invention provides an image capture method. By detecting three-axis acceleration values and image quality, and finishing an image capture operation after the three-axis acceleration values exchange and the image quality become less than a predetermined value, the automatic finish of the image capture operation is achieved without fixing the image capture device or pushing any button by a user. The user experiences are effectively enhanced, and simultaneously the lifetime of the switch component installed on the image capture device is also lengthened.

The present invention also provides an image capture method. Since the three-axis acceleration sensor and the optical mouse assembly are utilized for detections simultaneously, and further the values are determined and judged, the status of the image capture device can be precisely judged. Therefore, an automatic start or an automatic finish of the image capture operation is implemented, and the judgment error is avoided.

In accordance with an aspect of the present invention, there is provided an image capture method. The image capture method includes steps of: (a) providing an image capture device, (b) starting an image capture operation, (c) detecting a first axial acceleration value, a second axial acceleration value, a third axial acceleration value and an image quality, (d) judging if any two of the first axial acceleration value, the second axial acceleration value and the third axial acceleration value exchange with each other, (e) judging if the image quality is less than a predetermined value, and (f) finishing the image capture operation. When the result of judgment of the step (d) is True, the step (e) is performed after the step (d), when the result of judgement of the step (d) is False, the step (c) is re-performed after the step (d), when the result of judgement of the step (e) is True, the step (f) is performed after the step (e), and when the result of judgment of the step (e) is False, the step (c) is re-performed after the step (e).

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
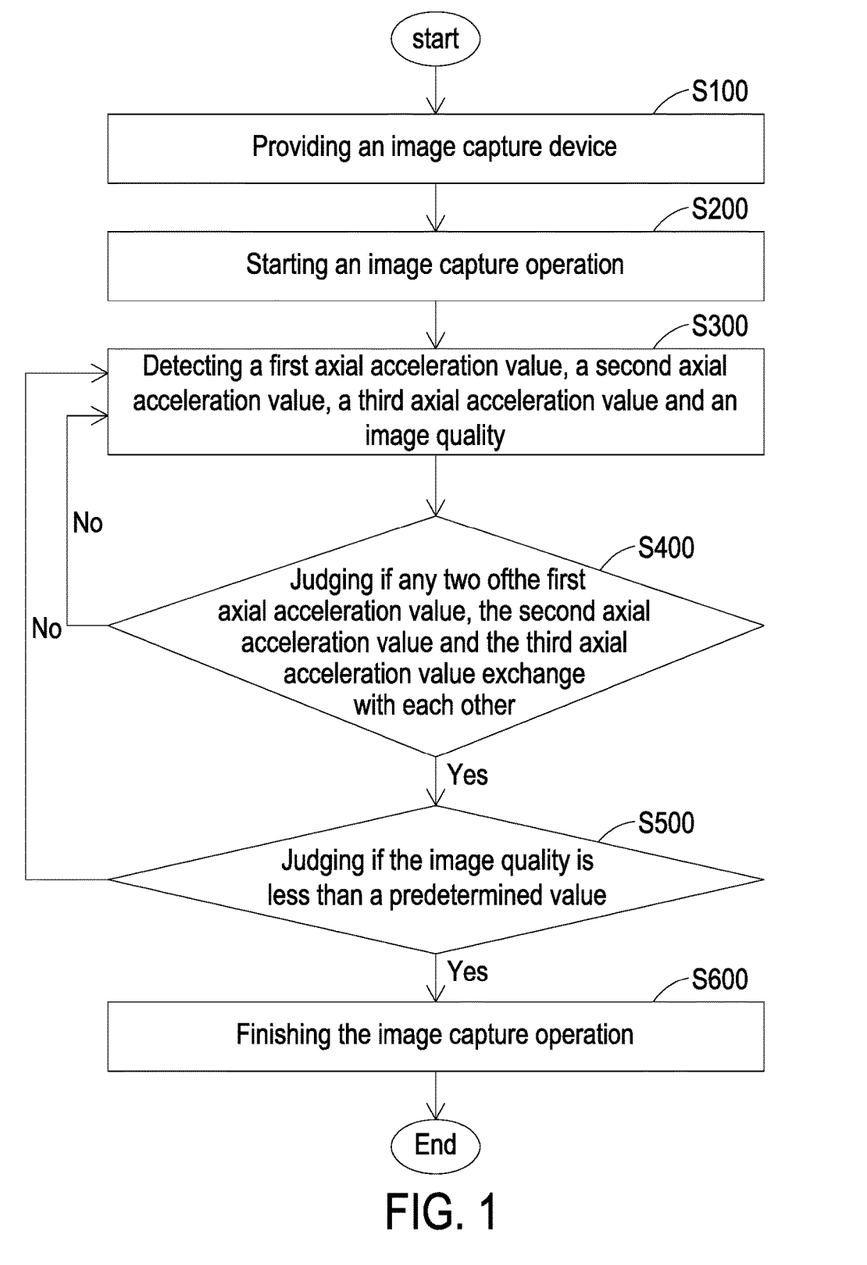
FIG. 1 schematically illustrates the flow chart of an image capture method according to an embodiment of the present invention.
Figure 2:
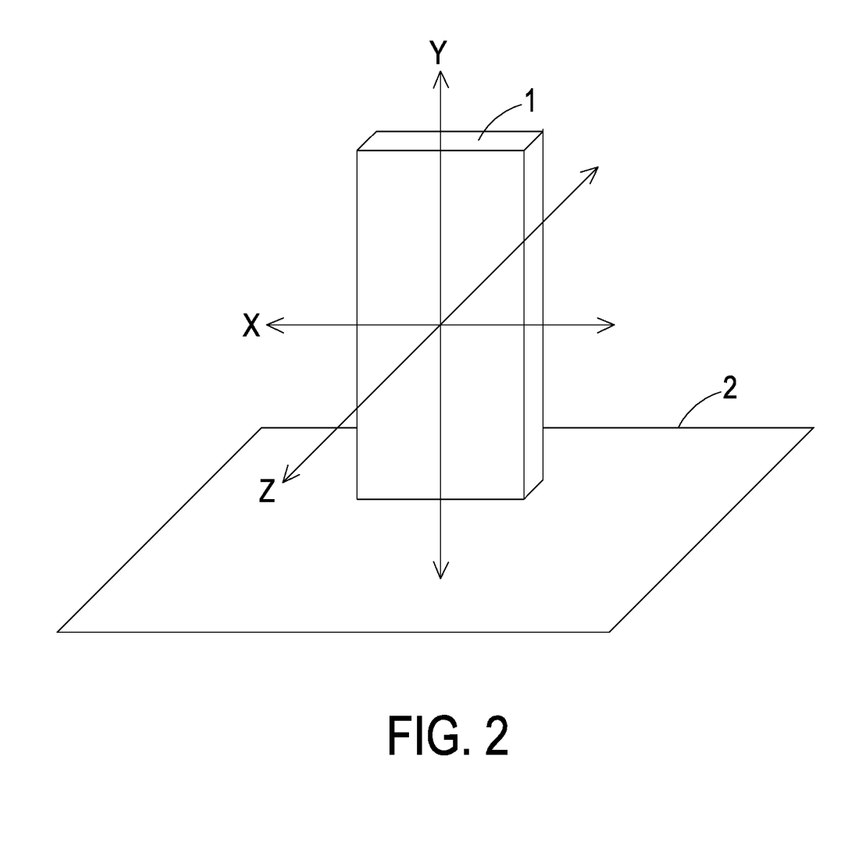
FIG. 2 schematically illustrates that the image capture device of the present invention performs an image capture operation of a media and the three-axis directions.
Figure 3:
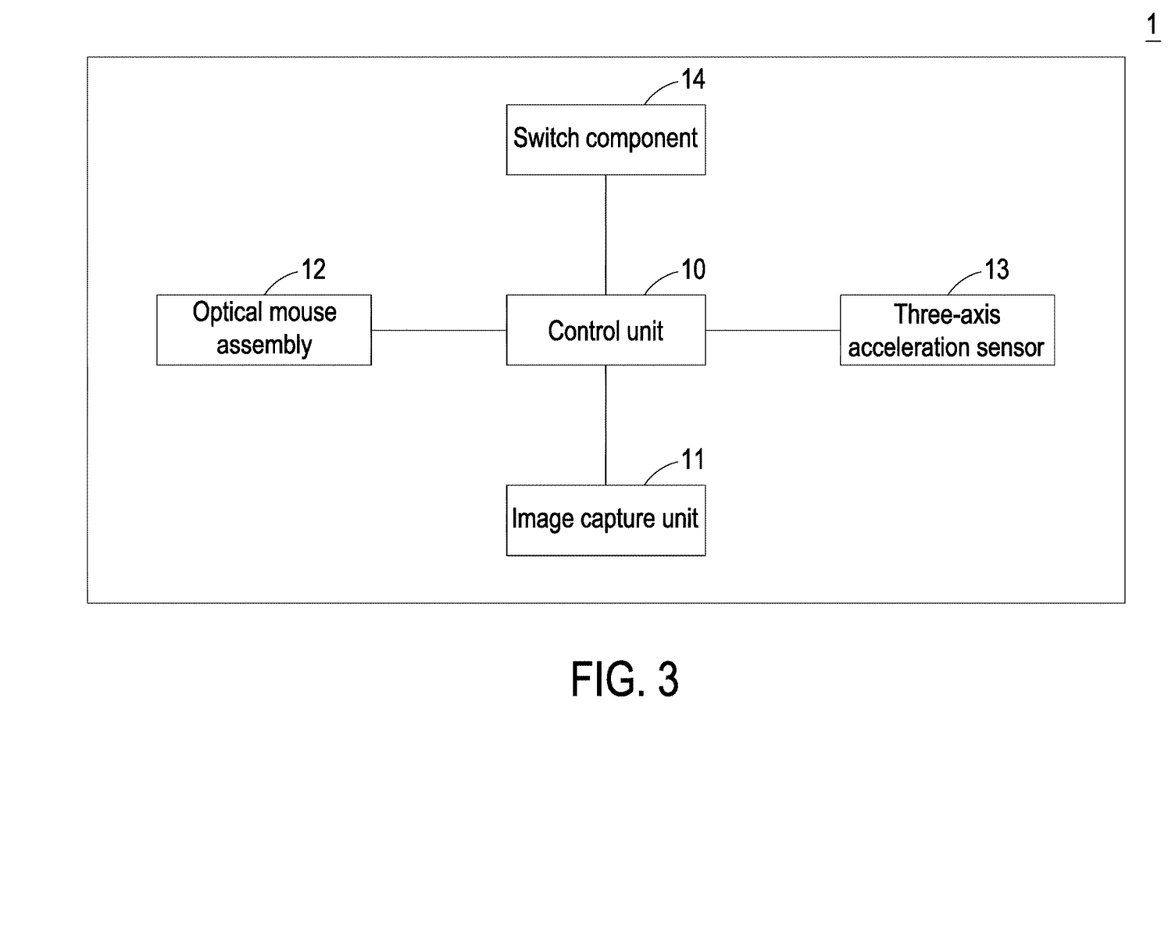
FIG. 3 schematically illustrates the block diagram of the configuration of the image capture device of the present invention.
Figure 4A:
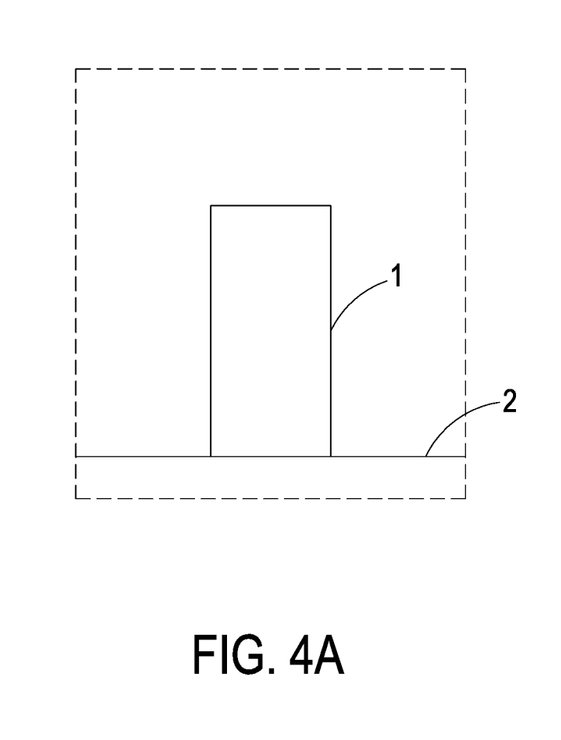
FIG. 4A schematically illustrates the front view of the image capture device putted on the media.
Figure 4B:
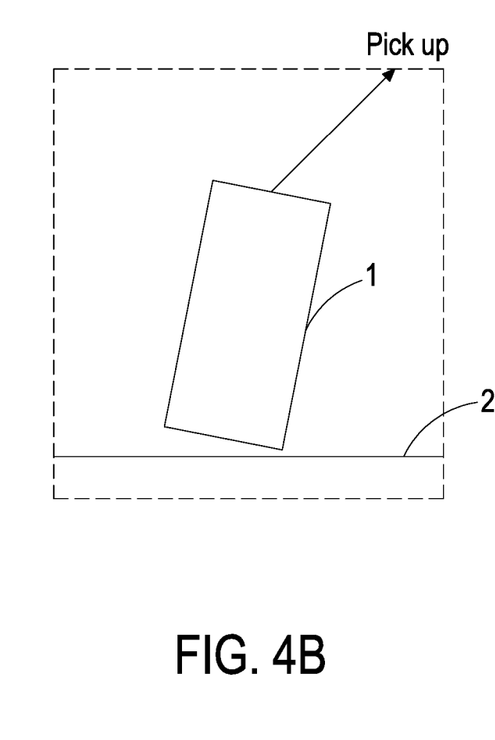
FIG. 4B schematically illustrates the front view of the image capture device picked up from the media.
Figure 5:
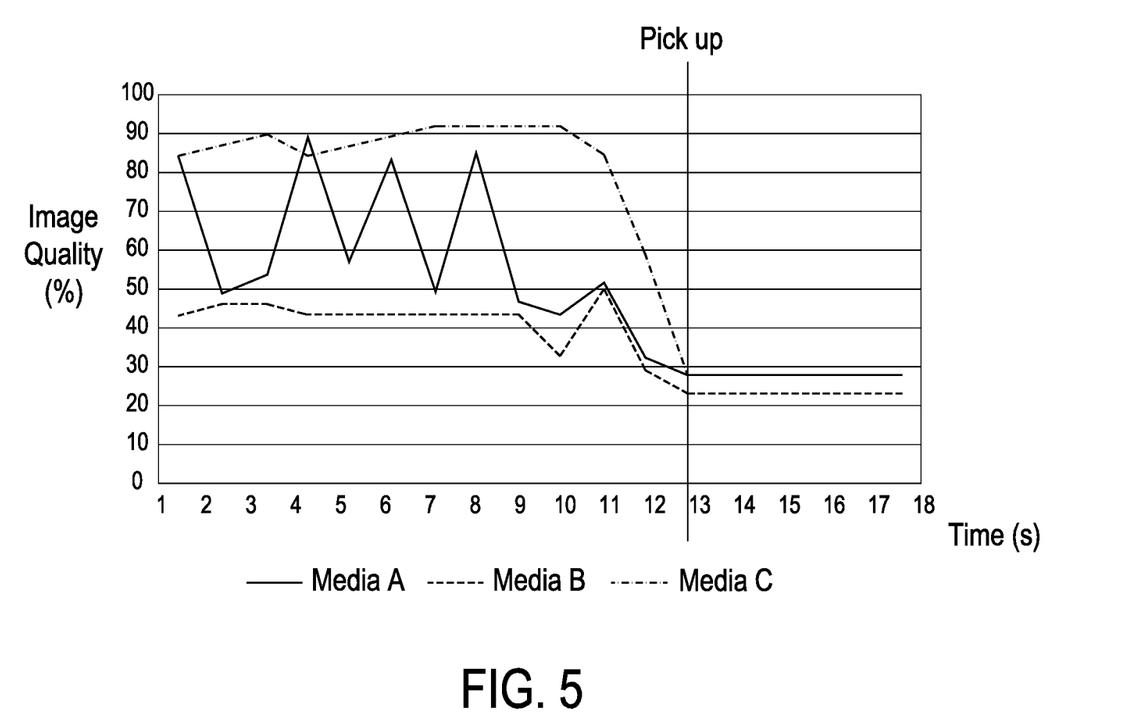
FIG. 5 schematically illustrates the image quality-time diagram of a media A, a media B and a media C made of different materials under the same operational conditions.

Please refer to FIG. 1, FIG. 2, FIG. 3, FIG. 4A, FIG. 4B and FIG. 5. FIG. 1 schematically illustrates the flow chart of an image capture method according to an embodiment of the present invention. FIG. 2 schematically illustrates that the image capture device of the present invention performs an image capture operation of a media and the three-axis directions. FIG. 3 schematically illustrates the block diagram of the configuration of the image capture device of the present invention. FIG. 4A schematically illustrates the front view of the image capture device putted on the media. FIG. 4B schematically illustrates the front view of the image capture device picked up from the media. FIG. 5 schematically illustrates the image quality-time diagram of a media A, a media B and a media C made of different materials under the same operational conditions. As shown in FIGS. 1-5, an image capture method of the present invention is applied to perform an image capture operation of a media 2. The image capture method at least includes steps as follows. Firstly, as shown in step S100, providing an image capture device 1. The image capture device 1 is not limited to a hand-held scanner and is preferred to includes a control unit 10, an image capture unit 11, an optical mouse assembly 12 and a three-axis acceleration sensor 13. The three-axis acceleration sensor 13 can be a three-axial gyroscope.

Next, as shown in step S200, starting an image capture operation. Then, as shown in step S300, detecting a first axial acceleration value, a second axial acceleration value, a third axial acceleration value and an image quality. The first axial acceleration value, the second axial acceleration value and the third axial acceleration value are respectively the acceleration values on X-axis, Y-axis and Z-axis, but not limited herein. The image quality detected is preferred to be converted into a numerical value by the control unit 10, but not limited herein, in which the image quality can also be converted into a numerical value by the optical mouse assembly 12.

Next, as shown in step S400, judging if any two of the first axial acceleration value, the second axial acceleration value and the third axial acceleration value exchange with each other. When the result of judgment of the step S400 is True, the step S500 is performed after the step S400, when the result of judgement of the step S400 is False, the step S300 is re-performed after the step S400. That is, if a user rotates the image capture device 1 to pick up the image capture device 1 from the media 2 (as shown in FIG. 4A and FIG. 4B), two of the first axial acceleration value, the second axial acceleration value and the third axial acceleration value must exchange with each other (i.e. the readings exchange with each other). Therefore, the exchange of readings can be utilized for judging if a user wants to finish the image capture operation.

For example, when the image capture device 1 is rotated from being put horizontally to handheld, the result of judgment of the step S400 is True, and the first axial acceleration value and the second axial acceleration value exchange with each other, which means the readings of the X-axis acceleration value and the Y-axis acceleration value exchange with each other. When the image capture device 1 is rotated from being put vertically to handheld, the result of judgment of the step S400 is True, and the second axial acceleration value and the third axial acceleration value exchange with each other, which means the readings of the Y-axis acceleration value and the Z-axis acceleration value exchange with each other.

Next, as shown in step S500, judging if the image quality is less than a predetermined value. In particular, the step S500 is a step of judging if the numerical value of the image quality converted by the control unit 10 is less than a default value (i.e. a default percentage), which is not limited to 30% (as shown in FIG. 5). The value of the predetermined value is preferably obtained through comparing the image qualities detected by the image capture device 1 while capturing images under the same operational conditions and operational behaviors and being picked up from mediums made of different materials. It can be known from FIG. 5 that when the image capture device 1 leaves the media A, the media B or the media C, the image qualities are all less than 30%. The percentage of the image quality has to be adjusted according to the resolution capability of the optical mouse assembly 12. When the result of judgement of the step S500 is True, the step S600 of finishing the image capture operation is performed after the step S500, and when the result of judgment of the step S500 is False, the step S300 is re-performed after the step S500. That is, the step S300 of detection and the follow-up step S400 of judgment are re-performed after the step S500.

Through the image capture method mentioned above, the automatic finish of the image capture operation is achieved without fixing the image capture device or pushing any button by a user. The user experiences are effectively enhanced, and simultaneously the lifetime of the switch component installed on the image capture device is also lengthened.

In some embodiments, the step S200 of the image capture method of the present invention is preferably implemented by the image capture unit 11, the step S300 is preferably implemented by the three-axis acceleration sensor 13, and the step S400, the step S500 and the step S600 are preferably implemented by the control unit 11, but not limited thereto. In particular, the image capture device 1 includes the control unit 10, the image capture unit 11, the optical mouse assembly 12 and the three-axis acceleration sensor 13. The image capture unit 11 is connected with the control unit 10 for performing the image capture operation. The optical mouse assembly 12 is connected with the control unit 10 for detecting the image quality. The three-axis acceleration sensor 13 is connected with the control unit 10 for detecting the first axial acceleration value, the second axial acceleration value and the third axial acceleration value.

In the field of the present invention, it is well-known that if only the optical mouse assembly 12 is utilized for judging the image quality, a judgment error is going to occur since the image quality is too low due to creases of the media 2 or the floating of the optical mouse assembly 12 and the vacant of the corresponded position thereof. Under this circumstance, the image capture method of the present invention utilizes the three-axis acceleration sensor 13 and the optical mouse assembly 12 simultaneously for detection, and further judges the numeric value, so that the status of the image capture device 1 can be precisely judged. Therefore, an automatic finish of the image capture operation is implemented, and judgment errors are avoided.

Figure 6:
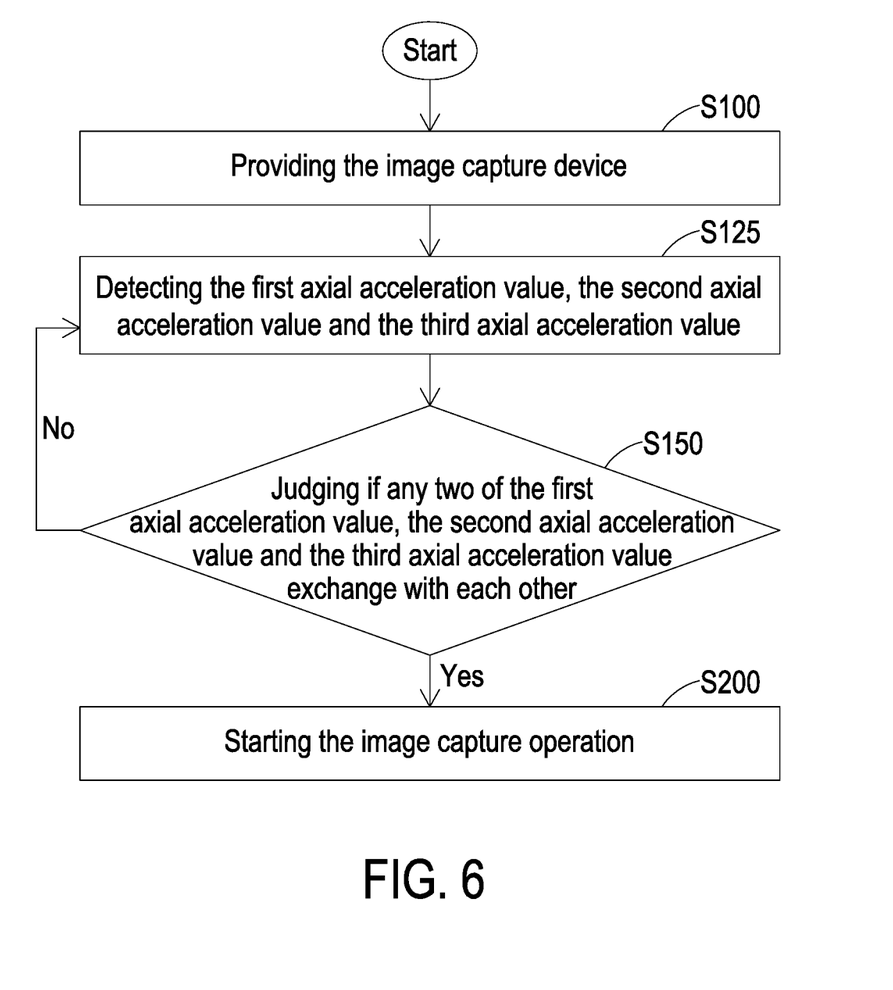
FIG. 6 schematically illustrates the detailed flow chart of the steps S100-S200 of an image capture method according to an embodiment of the present invention.
Figure 7:
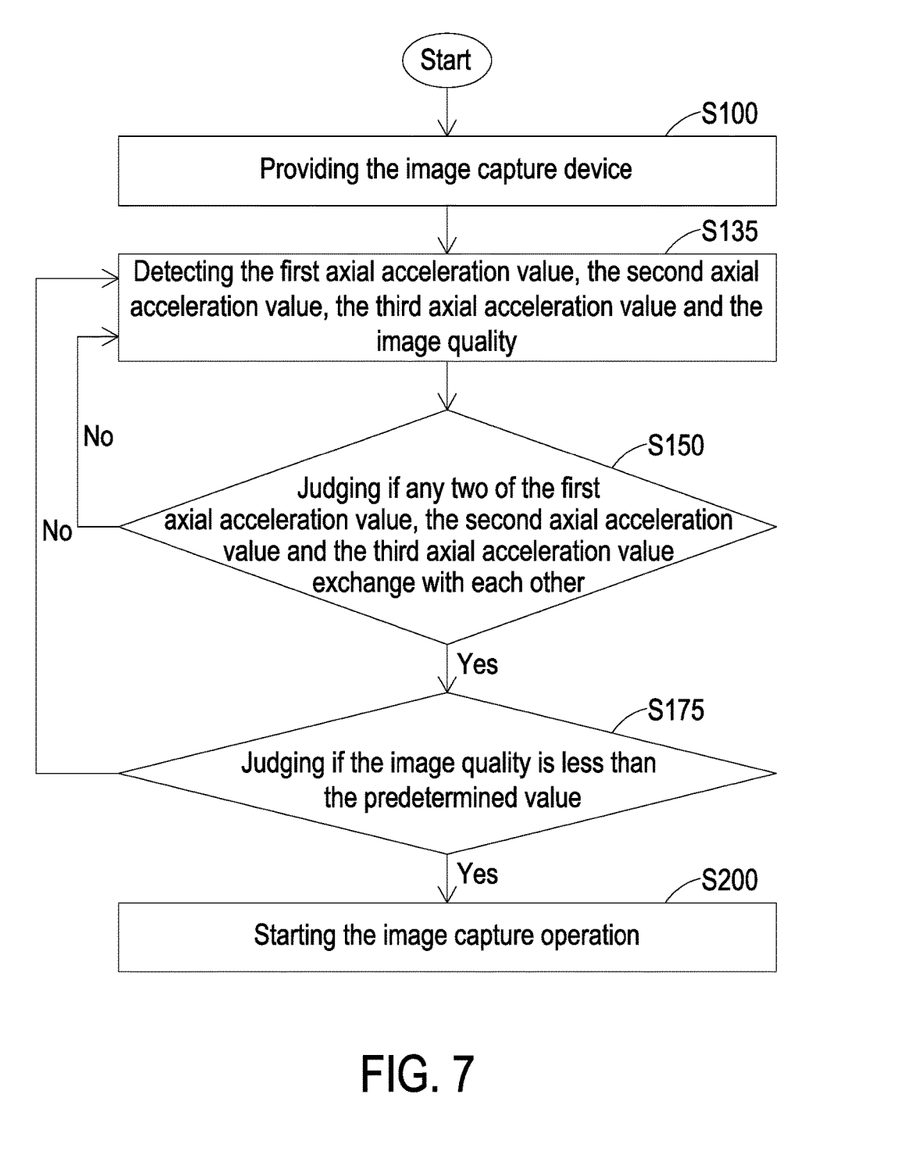
FIG. 7 schematically illustrates the detailed flow chart of the steps S100-S200 of an image capture method according to another embodiment of the present invention.
Figure 8:
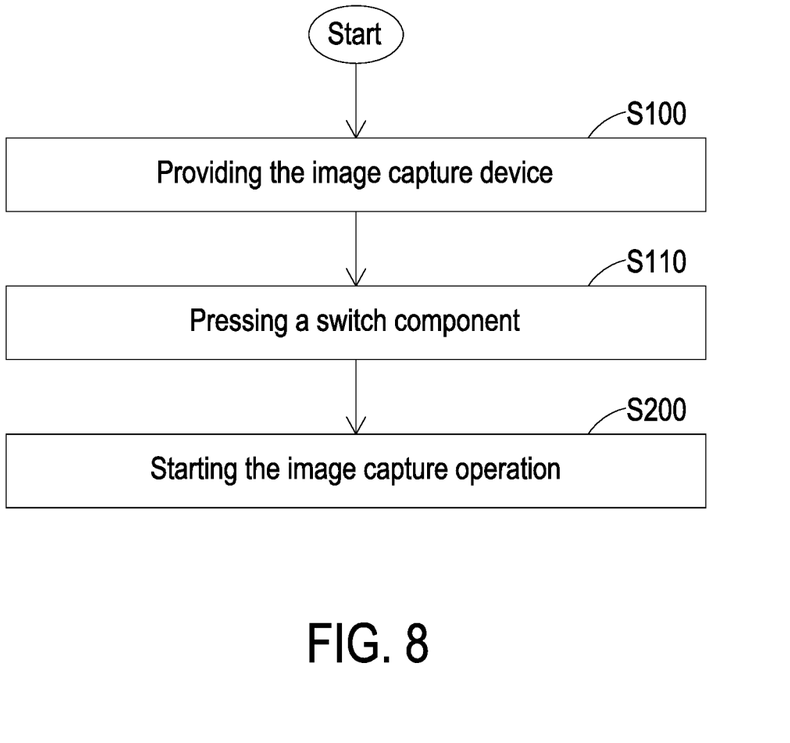
FIG. 8 schematically illustrates the detailed flow chart of the steps S100-S200 of an image capture method according to still another embodiment of the present invention.

Furthermore, besides the embodiments mentioned above, the present invention further includes an embodiment disclosing an image capture method with the functions of automatic start and automatic finish. Please refer to FIG. 6, FIG. 7 and FIG. 8. FIG. 6 schematically illustrates the detailed flow chart of the steps S100-S200 of an image capture method according to an embodiment of the present invention. FIG. 7 schematically illustrates the detailed flow chart of the steps S100-S200 of an image capture method according to another embodiment of the present invention. FIG. 8 schematically illustrates the detailed flow chart of the steps S100-S200 of an image capture method according to still another embodiment of the present invention. As shown in FIG. 6, FIG. 7 and FIG. 8, the image capture method of the present invention includes several embodiments that are possible to implement a start of an image capture operation, and particularly an automatic start of an image capture operation.

In some embodiments, the image capture method further includes steps, before the step S200, of detecting the first axial acceleration value, the second axial acceleration value and the third axial acceleration value as shown in step S125, and judging if any two of the first axial acceleration value, the second axial acceleration value and the third axial acceleration value exchange with each other as show in step S150. When the result of judgment of the step S150 is True, the step S200 is performed after the step S150, and when the result of judgment of the step S150 is False, the step S125 is re-performed after the step S150. In other words, the detection of the readings of the three-axial acceleration is utilized for judging if an image capture operation should be performed.

For example, when the image capture device is rotated from handheld to be put horizontally, the result of judgment of the step S150 is True, and the first axial acceleration value and the second axial acceleration value exchange with each other. When the image capture device is rotated from handheld to be put vertically, the result of judgment of the step S150 is True, and the second axial acceleration value and the third axial acceleration value exchange with each other.

In some embodiments, the image capture method further includes steps, before the step S200, of detecting the first axial acceleration value, the second axial acceleration value, the third axial acceleration value and the image quality as shown in step S135, judging if any two of the first axial acceleration value, the second axial acceleration value and the third axial acceleration value exchange with each other as shown in step S150, and judging if the image quality is less than the predetermined value as shown in step S175. When the result of judgment of the step S150 is True, the step S175 is performed after the step S150, when the result of judgement of the step S150 is False, the step S135 is re-performed after the step S150, when the result of judgement of the step S175 is True, the step S200 is performed after the step S175, and when the result of judgement of the step S175 is False, the step S135 is re-performed after the step S175. In brief, the manner of finishing the image capture operation after the three-axis acceleration values exchange and the image quality become less than a predetermined value may also be applied to starting the image capture operation. Since the flow charts and the theories are described in the above-mentioned embodiments, it is not redundantly described herein. However, it should be noted that when the image capture device is rotated from handheld to a horizontal position, a vertical position or an oblique position to perform the image capture operation, and rotated reversely to handheld, the results of judgements of the step S150 and the step S400 are both True, and the two of the first axial acceleration value, the second axial acceleration value and the third axial acceleration value that exchange with each other of the step S150 are as same as the two of the first axial acceleration value, the second axial acceleration value and the third axial acceleration value that exchange with each other of the step S400.

Certainly, in some embodiments, the image capture method of the present invention may further include a step S110, before the step S200, of pressing a switch component to start an image capture operation, and the manner of automatic finish may only be used to control the end of the image capture operation.

From the above description, the present invention provides an image capture method. By detecting three-axis acceleration values and image quality, and finishing an image capture operation after the three-axis acceleration values exchange and the image quality become less than a predetermined value, the automatic finish of the image capture operation is achieved without fixing the image capture device or pushing any button by a user. The user experiences are effectively enhanced, and simultaneously the lifetime of the switch component installed on the image capture device is also lengthened. Meanwhile, since the three-axis acceleration sensor and the optical mouse assembly are utilized for detections simultaneously, and further the values are determined and judged, the status of the image capture device can be precisely judged. Therefore, an automatic start or an automatic finish of the image capture operation is implemented, and the judgment error is avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image capture method, comprising steps of:
   (a) providing an image capture device;
   (b) starting an image capture operation;
   (c) detecting a first axial acceleration value, a second axial acceleration value, a third axial acceleration value and an image quality;
   (d) judging if any two of the first axial acceleration value, the second axial acceleration value and the third axial acceleration value exchange with each other;
   (e) judging if the image quality is less than a predetermined value; and
   (f) finishing the image capture operation,
   wherein when the result of judgment of the step (d) is True, the step (e) is performed after the step (d), when the result of judgement of the step (d) is False, the step (c) is re-performed after the step (d), when the result of judgement of the step (e) is True, the step (f) is performed after the step (e), and when the result of judgment of the step (e) is False, the step (c) is re-performed after the step (e).

2. The image capture method according to claim 1 further comprising steps, before the step (b), of:
   (a1) detecting the first axial acceleration value, the second axial acceleration value and the third axial acceleration value; and
   (a2) judging if any two of the first axial acceleration value, the second axial acceleration value and the third axial acceleration value exchange with each other,
   wherein when the result of judgment of the step (a2) is True, the step (b) is performed after the step (a2), and when the result of judgment of the step (a2) is False, the step (a1) is re-performed after the step (a2).

3. The image capture method according to claim 2, wherein when the image capture device is rotated from handheld to be put horizontally, the result of judgment of the step (a2) is True, and the first axial acceleration value and the second axial acceleration value exchange with each other.

4. The image capture method according to claim 2, wherein when the image capture device is rotated from handheld to be put vertically, the result of judgment of the step (a2) is True, and the second axial acceleration value and the third axial acceleration value exchange with each other.

5. The image capture method according to claim 1 further comprising steps, before the step (b), of:
 (a1) detecting the first axial acceleration value, the second axial acceleration value, the third axial acceleration value and the image quality;
 (a2) judging if any two of the first axial acceleration value, the second axial acceleration value and the third axial acceleration value exchange with each other; and
 (a3) judging if the image quality is less than the predetermined value,
 wherein when the result of judgment of the step (a2) is True, the step (a3) is performed after the step (a2), when the result of judgement of the step (a2) is False, the step (a1) is re-performed after the step (a2), when the result of judgement of the step (a3) is True, the step (b) is performed after the step (a3), and when the result of judgment of the step (a3) is False, the step (a1) is re-performed after the step (a3).

6. The image capture method according to claim 5, wherein when the image capture device is rotated from handheld to a horizontal position, a vertical position or an oblique position to perform the image capture operation, and rotated reversely to handheld, the results of judgements of the step (a2) and the step (d) are True, and the two of the first axial acceleration value, the second axial acceleration value and the third axial acceleration value that exchange with each other of the step (a2) are as same as the two of the first axial acceleration value, the second axial acceleration value and the third axial acceleration value that exchange with each other of the step (d).

7. The image capture method according to claim 1 further comprising a step (b0), before the step (b), of pressing a switch component.

8. The image capture method according to claim 1, wherein when the image capture device is rotated from being put horizontally to handheld, the result of judgment of the step (d) is True, and the first axial acceleration value and the second axial acceleration value exchange with each other.

9. The image capture method according to claim 1, wherein when the image capture device is rotated from being put vertically to handheld, the result of judgment of the step (d) is True, and the second axial acceleration value and the third axial acceleration value exchange with each other.

10. The image capture method according to claim 1, wherein the image capture device comprises:
 a control unit;
 a three-axis acceleration sensor connected with the control unit for detecting the first axial acceleration value, the second axial acceleration value and the third axial acceleration value;
 an optical mouse assembly connected with the control unit for detecting the image quality; and
 an image capture unit connected with the control unit for performing the image capture operation.

* * * * *